United States Patent [19]
Barber

[11] Patent Number: 4,569,978
[45] Date of Patent: Feb. 11, 1986

[54] EMULSION POLYMERIZATION OF VINYLIDENE FLUORIDE POLYMERS IN THE PRESENCE OF TRICHLOROFLUOROMETHANE AS CHAIN TRANSFER AGENT

[75] Inventor: Leonard A. Barber, Warminster, Pa.

[73] Assignee: Pennwalt Corporation, Philadelphia, Pa.

[21] Appl. No.: 724,214

[22] Filed: Apr. 17, 1985

Related U.S. Application Data

[63] Continuation-in-part of Ser. No. 634,504, Jul. 25, 1984, abandoned.

[51] Int. Cl.[4] ............................................. C08F 14/22
[52] U.S. Cl. .................................... 526/206; 526/249; 526/253; 526/254; 526/255

[58] Field of Search ............... 526/206, 255, 254, 253, 526/249

[56] References Cited

U.S. PATENT DOCUMENTS 3,475,396 10/1969 McCain et al. ...................... 526/255
3,616,371 10/1971 Ukihashi et al. ..................... 526/255
4,123,602 10/1978 Ukihashi et al. ..................... 526/255

Primary Examiner—Harry Wong, Jr.

[57] ABSTRACT

Vinylidene fluoride polymers having a wide range of molecular weights are produced with reduced initiator consumption by using trichlorofluoromethane as a chain transfer agent in the emulsion polymerization process. Vinylidene fluoride homopolymers made by the process have a significantly reduced tendency to generate cavities at high temperatures and a greater resistance to discoloration at high temperatures.

17 Claims, No Drawings

EMULSION POLYMERIZATION OF VINYLIDENE FLUORIDE POLYMERS IN THE PRESENCE OF TRICHLOROFLUOROMETHANE AS CHAIN TRANSFER AGENT

This application is a continuation-in-part of application Ser. No. 634,504, filed July 25, 1984, which is now abandoned.

BACKGROUND OF THE INVENTION

The emulsion polymerization at moderate pressure of vinylidene fluoride using fluorinated surfactant and, as a free-radical initiator, diisopropyl peroxydicarbonate (hereinafter referred to as IPP) is taught in U.S. Pat. No. 3,475,396 dated Oct. 28, 1969. The same patent teaches that the amount of fluorinated surfactant necessary in the system can be reduced if a chain transfer agent is present in the reaction system. The process was refined in U.S. Pat. No. 3,857,827 dated Dec. 31, 1974 wherein a particularly high molecular weight product was produced in a relatively fast reaction by the use of IPP initiator dissolved in a solution of acetone (the acetone acting as a chain transfer agent). The process was further refined in U.S. Pat. No. 4,360,652 dated Nov. 23, 1982, which taught that high quality polymers were achieved when IPP (as an aqueous emulsion using a fluoroalkyl surfactant), isopropyl alcohol (hereinafter, IPA; used as the chain transfer agent) and monomer are added separately but simultaneously to an aqueous solution of the surfactant, either incrementally or continuously over the polymerization cycle. The present invention is a modification in which the use of trichlorofluoromethane (hereinafter also referred to as TCFM) in the polymerization process results, particularly in the case of vinylidene fluoride homopolymers, in a product that has a reduced tendency to generate cavities at the high temperatures (e.g., 550° F.) that may be encountered in melt forming processes and a greater resistance to discoloration at those temperatures. The initiator consumption is also independent of TCFM concentration and the use of TCFM results in a reduced requirement for initiator in the process. The need for IPA, or other materials as chain transfer agents is eliminated.

BRIEF SUMMARY OF THE INVENTION

In a process for preparing a high molecular weight vinylidene fluoride polymer by emulsion polymerization of monomer in a stirred aqueous reaction medium comprising vinylidene fluoride monomer, from about 0.5 to 6.0 grams per kilogram of the total amount of monomers used in the process of a polymerization initiator, from about 0.05 to 0.5 weight percent based on the total weight of monomer used in the process of a water-soluble fluoroalkyl surfactant emulsifier capable of emulsifying both the initiator and the reaction mass for the duration of the polymerization, and at least one chain transfer agent, and wherein additional monomer and initiator are added during the polymerization, the improvement which comprises including from about 0.5 to 8.0 mole percent based on the total amount of monomer used in the process of trichlorofluoromethane in the polymerization process as a chain transfer agent.

DETAILED DESCRIPTION

Polymerization Process

The invention can be understood by reference to the flow sheet which follows:

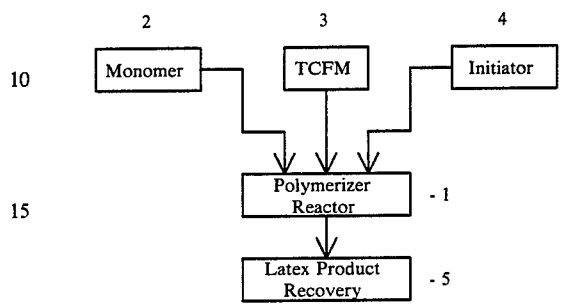

Referring to the flow sheet: pressured polymerizer reactor 1 equipped with a stirrer and heat control means, is initially charged with deionized water containing a conventional water-soluble fluorosurfactant (such as those taught in U.S. Pat. No. 2,559,752 or U.S. Pat. No. 3,239,970; See U.S. Pat. No. 4,360,652 at column 4, lines 16-38, for a discussion of useful fluorosurfactants), paraffin wax, monomer and, optionally, TCFM. The use of a horizontal polymerizer is preferred as it has less tendency to cause agitation induced coagulation during polymerization.

In the initial charge, i.e. charge prior to the first addition of initiator to start the polymerization, the concentration of the fluorosurfactant is about 0.05 to 0.5 weight percent (based on the total weight of the monomer to be used in the reaction), the preferred concentration is about 0.1 to 0.2 weight percent. The concentration of the paraffin wax is about 0.03 to 0.30 weight percent; the function of the wax is to prevent polymer adhesions to the reactor and is conventional. Any long chain saturated hydrocarbon wax or oil can be used.

All or part of the TCFM may be added to the initial charge. The amount of TCFM added, regardless of when it is added during the process, will be a function of the total monomer used in the process, including vinylidene fluoride and any comonomers, the desired melt viscosity of the reaction product, and the concentration of any IPA or other chain transfer agent used. The tables in the examples below give representative values of the amounts of TCFM used, expressed as a mol % of the total amount of monomer used in the reaction process. Generally, amounts of TCFM of from about 0.5 to 8.0 mole percent (1.5 to 6.0 mole percent preferred), based on the total amount of monomer, are used in the process.

After the polymerizer reactor has been charged with water, surfactant, wax and optionally, TCFM, the atmosphere of the polymerizer is subjected to a series of evacuations and nitrogen purges to ensure an oxygen-free environment for the polymerization and the system is sealed, agitated and brought to the desired reaction temperature (e.g. between about 60° to 90° C., preferably about 70° to 80° C.). Monomer (vinylidene fluoride plus any desired comonomers) from a supply 2 is then added until the desired operating pressure (about 300 to 1000 psig and preferably about 400-700 psig) is obtained.

When the initial charge does not contain TCFM, the addition of monomer is followed by the addition, from 3, of TCFM until the ratio, TCFM/monomer, to be maintained throughout the reaction is reached. [For purposes of simplifying the procedure, the TCFM is either added entirely to the initial charge or added entirely after the initial charge; however, the TCFM may be added, during the same process, both to the initial charge and after the initial charge]. IPA may be added simultaneously with the TCFM or added after the initial charge, generally by keeping the ratio of IPA to monomer constant, but in the preferred conditions it is omitted entirely from the process. The effect of various concentrations of IPA in the procedure are shown in the examples below.

In the next step, polymerization is begun by adding an incremental charge of polymerization initiator from source 4 or by simultaneously adding incremental charges or continuous feeds of monomer, chain transfer agent and, polymerization initiator. The preferred initiator is diisopropyl peroxydicarbonate (IPP) which is used in amounts of about 0.5 to 6.0 grams of IPP per kilogram of monomer (preferred about 1.0 to 3.0 g/kg). Thereafter, incrementally or continuously, monomer, chain transfer agent and polymerization initiator are fed simultaneously in a constant ratio and at a rate which provides an essentially constant pressure within the polymerizer. Upon completion of the polymerization, the product is recovered as a latex, at 5, which latex generally has a solids content of from about 25 to 35 weight percent and which can optionally by concentrated by creaming or flash evaporation or the latex can be coagulated and the polymer recovered as a powder.

CHAIN TRANSFER AGENT

The role of the chain transfer agent in the reaction is discussed in U.S. Pat. No. 4,360,652, column 4 at lines 39 to 68. For purposes of the present invention, chain transfer agent is intended to encompass TCFM, as the result of using TCFM is to control the molecular weight of the product (see Examples 10 to 14). TCFM provides unexpected advantages with respect to lowering initiator consumption, reducing polymer voids and decreasing the discoloration of the polymer which advantages are not obtained with other chain transfer agents. Whereas other chain transfer agents when added in increasing amounts in order to lower the molecular weight of the product, require an increase in the amount of initiator used due to higher initiator consumption, TCFM can be added in varying concentrations to produce products with a wide range of molecular weights without the need to vary the initiator concentration. This is both more economical and provides a better quality product.

TESTS FOR HIGH TEMPERATURE VOIDS AND YELLOWNESS INDEX

For each specimen of polymer to be tested, a small plaque, (typical dimensions, 4 inches×2 inches×1/16 inch) was compression molded from the powder form of the polymer produced by the above method. Compression molding was done at 232° C. and 2500 psig for 5 minutes. The Yellowness Index (according to ASTM D1008) and the specific gravity (Sp. Gr.; measured by water displacement) of the molded plaque were measured. The Yellowness Index so obtained is referred to as the "initial value"; the specific gravity is referred to as "Sp. Gr. init."

The molded plaque was then heated at 288° C. in air for 10 minutes. After cooling to room temperature (about 25° C.) the final specific gravity ("Sp. Gr. final") and the "final value" of the Yellowness Index were measured.

The expansion in volume that occurred as a result of the heat treatment at 288° C. was used to quantify the extent of gas void production induced by that treatment. The percentage of high temperature voids (High Temp. Voids %) was defined as follows:

$$\text{High Temp. Voids \%} = \frac{(\text{Sp. Gr. init.} - \text{Sp. Gr. final})}{\text{Sp. Gr. init.}} \times 100$$

VINYLIDENE FLUORIDE POLYMERS

The term "vinylidene fluoride polymer" used herein for brevity includes both normally solid, high molecular weight homopolymers and copolymers within its meaning. Such copolymers include those containing at least 50 mole percent of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene, and any other monomer that would readily copolymerize with vinylidene fluoride. Particularly preferred are copolymers composed of from at least about 70 and up to 99 mole percent vinylidene fluoride, and correspondingly from 1 to 30 percent tetrafluoroethylene, such as disclosed in British Pat. No. 827,308; and about 70 to 99 percent vinylidene fluoride and 1 to 30 percent hexafluoropropene (see for example U.S. Pat. No. 3,178,399); and about 70 to 99 mole percent vinylidene fluoride and 1 to 30 mole percent trifluoroethylene. Terpolymers of vinylidene fluoride, hexafluoropropene and tetrafluoroethylene such as described in U.S. Pat. No. 2,968,649 and terpolymers of vinylidine fluoride, trifluoroethylene and tetrafluoroethylene are also representative of the class of vinylidene fluoride copolymers which can be prepared by the process embodied herein.

ILLUSTRATIVE EXAMPLES

Prior Art

Polymerization A

Medium Viscosity Polymer (17,325 Poise) According to the Prior Art

Step 1: Into a 2-gallon stainless steel horizontal autoclave were charged successively at room temperature 5115 grams of deionized water, 2.15 grams of ammonium perfluorodecanoate, and 4 grams of a paraffinic wax. The autoclave was closed, evacuated, and with agitation, heated to about 75° C. Approximately 454 grams of vinylidene fluoride (VDF) monomer were then charged to elevate the pressure to about 650 psig.

Step 2: Approximately 32 ml of the chain transfer agent (CTA) solution was added which is proportional to the initial 454 gram VDF charge. This solution (12 ml IPA in 150 ml deionized water) was added at a fixed ratio to VDF throughout the polymerization.

Step 3: Polymerization was begun by introducing the initiator (IPP) at a level equal to 1.5 g/kg VDF in the initial charge. This was accomplished by rapidly pumping approximately 34 ml of a initiator emulsion of deionized water containing 2% IPP and 0.15% emulsifying agent (perfluorodecanoate).

Step 4: VDF, IPP and IPA were added simultaneously and at an essentially constant rate into the reaction mixture over a period of approximately 3.3 hours. VDF was added at a rate of about 565 g/hour. IPP (at a concentration of 0.02 g/ml) was pumped in at a rate of about 2.5 g/hour. IPA (at a concentration of about 0.063 g/ml in deionized water) was pumped in at a rate of about 2.53 g/hour.

Step 5: After completion of Step 4, the reaction mixture was allowed to react-out over a period of about 0.5 hours. At the conclusion of the react-out period, the autoclave was cooled, vented, drained, and opened. Polymer adhesions were seen to be negligible and those, combined with the coagulum filtered from the latex represented about 1.5% of the total monomer charge. The recovered latex product (about 30% by weight solids) was then coagulated, washed with deionized water, and dried at about 110° C. to produce the latex product in powder form. A rheological profile was obtained from a portion of the recovered latex powder; the apparent melt viscosity, at a shear rate of 100 sec$^{-1}$, was 17,325 poise with a standard error of less than 7%.

The results of testing for high temperature voids and Yellowness Index are summarized as follows:

| IPP (g/kg of VDF) | IPA (g/kg of VDF) | High Temp. Voids % | Yellowness Initial | Index Final |
| --- | --- | --- | --- | --- |
| 4.1 | 4.1 | 19 | 10 | 44 |

Prior Art

Polymerization B

Low Viscosity Polymer (10,450 Poise) According to the Prior Art

The procedure of Polymerization A was substantially followed with the following exceptions:

Although IPA was added in the form of a solution that was similar to that used in Polymerization A, the amount of IPA added, when it was added, was about 1.73 times the amount added in Polymerization A.

Although IPP was also added in the form of the emulsion used in Polymerization A, the amount of IPP added, when it was added, was about 1.44 times the amount added in Polymerization A.

The latex product had an apparent melt viscosity of 10,450 poise.

The results of testing for high temperature voids and Yellowness Index are summarized as follows:

| IPP (g/kg of VDF) | IPA (g/kg of VDF) | High Temp. Voids % | Yellowness Initial | Index Final |
| --- | --- | --- | --- | --- |
| 5.9 | 7.3 | 37 | 8 | 30 |

EXAMPLES 1-4

Polymers synthesized by Adding Both IPA and TCFM Incrementally

The procedure of Polymerization A was substantially followed, with the following exceptions:

Although IPA and IPP were added as described in Polymerization A, the amount of IPA and IPP, when they were added, were adjusted in a manner that can be calculated from the IPP concentration in the summaries of test results below and in Polymerization A. [e.g. in Example 2, the amount of IPP added was about 1.3/4.1 times the amount of IPP used in Polymerization A].

In addition, TCFM was added to the system both during Step 1, after the monomer was added, and during Step 4, simultaneously with the VDF, IPP and IPA. The amount of TCFM added during any step was proportioned to the amount of VDF added during that step and is given in the summary of test results below for each example.

The test results are summarized as follows:

| Example | Apparent Melt Viscosity | IPP (g/kg of VDF) | IPA (g/kg of VDF) | TCFM (mole % of VDF) | High Temp Voids % | Yellowness Initial | Index Final |
| --- | --- | --- | --- | --- | --- | --- | --- |
| 1 | 2,000 | 2.0 | 4.6* | 5.8 | 16.0 | 4.2 | not done |
| 2 | 20,580 | 1.3 | 1 | 1.85 | 2.5 | 2.6 | 12.7 |
| 3 | 14,395 | 1.4 | 2 | 1.85 | 3.5 | 3.2 | 15.3 |
| 4 | 7,335 | 1.8 | 3* | 1.85 | 6.9 | 3.6 | 19.4 |

*Coagulum is in excess of 30% of total mass of monomer feed.

EXAMPLES 5-9

Polymers Synthesized Without IPA and Adding TCFM Incrementally

The procedure of Polymerization A was substantially followed, with the following exceptions:

IPA was not used.

Although IPP was added in the form of an emulsion that was the same as that used in Polymerization A, the amount of IPP, when added, was adjusted in a manner that can be calculated from the summary of test results below by a method of calculation described in Examples 2-4.

In addition, TCFM was added to the system, both during Step 1, after the monomer was added, and during Step 4, simultaneously with the VDF and IPP. The amount of TCFM added during any step was proportional to the amount of VDF added during that step and is given in the summary of test results below for each example.

The tests results are summarized as follows:

| Example | Apparent Melt Viscosity | IPP (g/kg of VDF) | IPA (g/kg of VDF) | TCFM (mole % of VDF) | High Temp. Voids % | Yellowness Initial | Index Final |
| --- | --- | --- | --- | --- | --- | --- | --- |
| 5 | 34,721 | 1.1 | 0 | 1.65 | 0.7 | 7.4 | 16.6 |
| 6 | 14,250 | 1.0 | 0 | 2.90 | 2.7 | 4.6 | 11.8 |
| 7 | 10,342 | 1.0 | 0 | 3.71 | 4.1 | 2.8 | 15.5 |

-continued

| Example | Apparent Melt Viscosity | IPP (g/kg of VDF) | IPA (g/kg of VDF) | TCFM (mole % of VDF) | High Temp. Voids % | Yellowness Initial | Index Final |
|---------|------------------------|-------------------|-------------------|----------------------|---------------------|--------------------|-------------|
| 8 | 8,010 | 1.0 | 0 | 4.18 | 5.1 | 4.3 | 20.7 |
| 9 | 4,700 | 1.1 | 0 | 5.80 | 7.0 | 1.8 | 17.4 |

EXAMPLES 10-14

Polymers Synthesized Without IPA and Adding TCFM only to the Initial Charge

The procedure of Polymerization A was substantially followed, with the following exceptions:

IPA was not used.

Although IPP was added in the form of emulsion that was the same as that used in Polymerization A, the amount of IPP, when added, was adjusted in a manner that can be calculated from the summary of test results below by a method of calculation described in Examples 1–4.

In addition, TCFM was added to the system during Step 1, after the monomer was added. The amount of TCFM added was proportioned to the total amount of VDF used (2300 g) and the proportion is given in the summary of test results below for each example.

The test results are summarized as follows:

VDF. The VDF was added at a rate of about 540 grams per hour for 3 hours until a total, including the initial charge, of 2027 grams of VDF, 88 grams of TCFM (1.93 mole % based on total monomer) and 276 grams of HFP had been added. Additional initiator was added to the autoclave during the reaction in amounts sufficient to maintain the reaction. Approximately 80 ml of additional initiator emulsion were added during the first 1½ hours. Thereafter, the addition of initiator was discontinued because such addition was not needed to maintain the polymerization. The initiator used amounted to 1.13 grams per kilogram of total monomer. The recovered latex had a solids content of 30.86% by weight. The latex was coagulated, washed with D.I. water and dried at about 110° C. to produce the copolymer product in powder form. The copolymer had an apparent melt viscosity of 22,125 poise. High temperature voids were 1.25%.

The above procedure was repeated except that 0.21

| Example | Apparent Melt Viscosity | IPP (g/kg of VDF) | IPA (g/kg of VDF) | TCFM (mole % of VDF) | High Temp. Voids % | Yellowness Initial | Index Final |
|---------|------------------------|-------------------|-------------------|----------------------|---------------------|--------------------|-------------|
| 10 | 21,609 | 1.2 | 0 | 1.58 | 1.4 | 5.6 | 20.7 |
| 11 | 13,965 | 1.3 | 0 | 2.09 | 7.5 | 9.0 | — |
| 12 | 13,796 | 1.2 | 0 | 2.09 | 1.3 | 4.9 | 17.5 |
| 13 | 10,141 | 1.1 | 0 | 2.60 | 4.0 | 11.9 | 27.5 |
| 14 | 7,884 | 1.4 | 0 | 3.13 | 7.3 | 10.6 | 28.0 |

It is evident from an examination of the results obtained in Examples 1–14 that the vinylidene fluoride homopolymers prepared according to the process of the invention are superior with respect to both high temperature voids and yellowness index when compared to polymers prepared by the prior art Polymerizations A and B above.

The following examples illustrate the preparation of copolymers and terpolymers using TCFM as a chain transfer agent.

EXAMPLE 15

A vinylidene fluoride-hexafluoropropene copolymer (88/12 wt %) was prepared.

Into a 2-gallon stainless steel horizontal autoclave were charged successively at room temperature 4900 ml of deionized (D.I.) water, 215 ml of 1% by weight ammonium perfluorodecanoate in D.I. water, (to give a total charge of 5115 grams of D.I. water) and 4 grams of a paraffinic wax. The autoclave was closed, evacuated, and, with agitation (72 rpm), heated to about 75° C. Approximately 397 grams of VDF monomer, 56 grams of hexafluoropropene (HFP) monomer and 18 grams of TCFM were then charged to elevate the pressure in the autoclave to about 650 psig. Polymerization was begun by introducing about 50 ml of initiator emulsion (2% by weight IPP and 0.15% by weight ammonium perfluorodecanoate in water) into the autoclave. Monomers and TCFM were added to the autoclave throughout the reaction, at a constant ratio of approximately 1.2 grams of TCFM and 4 grams of HFP per 28.35 grams of mol % of IPA (isopropanol) based on total monomer was used in place of the TCFM as a chain transfer agent. It was necessary to add initiator throughout the polymerization. The initiator used amounted to 2.35 grams per kilogram of total monomer or about twice that needed in Example 15.

EXAMPLE 16

A vinylidene fluoride-trifluoroethylene copolymer (70/30 wt %) was prepared by a procedure similar to that described in Example 15. The autoclave was charged with 4900 ml of D.I. water, 215 ml of 1% by weight ammonium perfluorodecanoate in D.I. water, and 1 gram of a paraffinic wax, closed, evacuated and, with agitation (72 rpm), heated to about 75° C. Approximately 255 grams of VDF monomer, 108 grams of trifluoroethylene monomer, and 14 grams of TCFM were then charged which elevated the pressure to about 650 psig. Polymerization was begun by introducing about 85 ml of the initiator emulsion to the initial charge in the autoclave. Monomers and TCFM were added throughout the reaction in a constant ratio of approximately 1.5 grams of TCFM and 12 grams of trifluoroethylene per 28.35 grams of VDF. The VDF was added at a rate of about 540 grams per hour for about two hours & forty minutes until a total, including the initial charge, of 1600 grams of VDF, 88 grams of TCFM (1.92 mol % based on total monomer) and 690 grams of trifluoroethylene had been added. Additional initiator was added to the autoclave in amounts sufficient to maintain the reaction. Approximately 35 ml of additional initiator were added in the first ¾ hour. Thereafter, the addition of initiator was discontinued. The IPP initiator used amounted to 1.05 grams per kilogram of total monomers. The recovered latex had a solids content 30.07% by weight. The latex was coagulated, washed with D.I. water and dried at about 110° C. to convert the copolymer product to powder form. The copolymer had an apparent melt viscosity of 34,867 poise.

EXAMPLE 17

A vinylidene fluoride-tetrafluoroethylene copolymer (70/30 wt %) was prepared by a procedure similar to that described in Example 15. The autoclave was charged with 4900 ml of D.I. water, 215 ml of 1% by weight ammonium perfluorodecanoate in D.I. water, and 1 gram of a paraffinic wax, closed, evacuated and, with agitation, (72 rpm) heated to about 75° C. Approximately 227 grams of a 90/10 weight % mixture of VDF and tetrafluoroethylene (TFE) monomers and 9 grams of TCFM were then charged to the autoclave which elevated the pressure to about 400 psig. Polymerization was begun by introducing about 37 ml of the initiator emulsion into the autoclave. Monomer mixture and TCFM were added throughout the reaction in a constant ratio of approximately 1.2 gram of TCFM per 28.53 gram of monomer mixture. About 540 grams of monomer mixture were added during the first hour, 794 grams during the second hour and 680 grams during the third hour until a total, including the initial charge, of about 2300 grams of monomer mixture and 88 grams (2.02 mole % based on total monomer) had been added. Additional initiator was added to the reaction in amounts sufficient to maintain the reaction. Approximately 63 ml of additional initiator were added during the first hour. Thereafter, further addition of initiator was not needed to maintain the polymerization. The amount of IPP used was equivalent to 0.87 gram per kilogram of total monomers. The recovered latex had a solids content of 31.0% by weight. The latex was coagulated, washed with D.I. water and dried at about 110° C. to produce the copolymer product in powder form. The copolymer had an apparent melt viscosity of 16,683 poise. High temperature voids were 1.89%.

EXAMPLE 18

A vinylidene fluoride-trifluoroethylene-tetrafluoroethylene terpolymer (60/33/7 wt %) was prepared by a procedure similar to that described in Example 15. The autoclave was charged with 4900 ml of D.I. water, 215 ml of 1% by weight ammonium perfluorodecanoate in D.I. water and 4 grams of a paraffinic wax, closed, evacuated and, with agitation (72 rpm), heated to about 75° C. Approximately 284 grams of 90/10 weight % mixture of VDF and TFE monomer, 140 grams of trifluoroethylene and 40 grams of TCFM were then charged to the autoclave which elevated the pressure to about 650 psig. Polymerization was begun by introducing about 35 ml of the initiator emulsion. Monomers and TCFM were added throughout the reaction in a constant ratio of approximately 4 grams of TCFM and 14 grams of trifluoroethylene per 28.35 grams of VDF-TFE mixture. About 650 grams of VDF-TFE mixture were added during the first hour and about 570 grams of monomer mixture were added during the second hour until a total, including the initial charge, of about 1531 grams of VDF-TFE mixture, 749 grams of trifluoroethylene and 230 grams of TCFM (5.25 mole % based on total monomers) had been added. Additional initiator was added to the reaction in amounts sufficient to maintain the reaction. Approximately 90 ml of additional initiator emulsion were added during the first ¾ hour following initiation of the reaction. Thereafter, no more initiator was added. The amount of IPP initiator used was equivalent to 1.10 grams per kilogram of total monomers. The recovered latex had a solids content of 30.0% by weight. The latex was coagulated and dried at about 110° C. to produce a powdered terpolymer product. The terpolymer had an apparent melt viscosity of 17,500 poise.

The results obtained in Examples 15–18 demonstrate the usefulness of TCFM as a chain transfer agent for making copolymers and terpolymers with reduced initiator consumption.

What is claimed:

1. In a process for preparing a high molecular weight vinylidene fluoride polymer by the emulsion polymerization of vinylidene fluoride monomer in a stirred, aqueous reaction medium which comprises charging to a heated reactor water, and with agitation from about 0.05 to 0.5 weight percent, based on the total amount of monomer used in the process, of a water-soluble fluoroalkyl surfactant capable of emulsifying both the initiator and the reaction mass for the duration of the polymerization, and sufficient monomer, at least about 50 mole percent of which is vinylidene fluoride, to obtain a pressure in the reactor of at least about 300 psig, adding from about 0.5 to 6.0 grams of initiator per kilogram of monomer to start the polymerization, and feeding additional amounts of monomer and initiator to the reacton medium during the polymerization process, the improvement which comprises including in the polymerization process from about 0.5 to 8.0 mole percent, based on the total amount of monomer used in the process, of trichlorofluoromethane as a chain transfer agent.

2. A process as defined in claim 1 wherein the polymerization initiator is diisopropyl peroxydicarbonate.

3. A process as defined in claim 2 wherein isopropyl alcohol and trichlorofluoromethane, are added, along with the monomer, separately but simultaneously to the system, incrementally or continuously over the polymerization cycle.

4. A process as defined in claim 2 wherein the only chain transfer agent present in the reaction mixture is trichlorofluoromethane.

5. A process as defined in claim 4 wherein trichlorofluoromethane is added only at the start of the polymerization.

6. A process as defined in claim 4 wherein trichlorofluoromethane is added along with the monomer separately but simultaneously to the system incrementally or continuously over the polymerization cycle.

7. The process of claim 1 wherein only vinylidene fluoride monomer is used so that the vinylidene fluoride polymer formed is the homopolymer of vinylidene fluoride.

8. The process of claim 1 wherein the initiator is added as the emulsified component of an aqueous emulsion containing the fluoroalkylsurfactant.

9. The process of claim 1 wherein at least one fluorine containing comonomer is present in the reaction medium.

10. The process of claim 1 wherein the comonomer is selected from the group consisting of tetrafluoroethylene, trifluoroethylene, chlorotrifluoroethylene, hexafluoropropene, vinyl fluoride, and pentafluoropropene.

11. The process of claim 1 wherein the polymerization is carried out at a temperature of from about 60° to 90° C. and at a pressure of from about 300 to 1000 psig.

12. The process of claim 1 including charging to the reactor from about 0.03 to 0.30 weight percent, based on the weight of monomer used in the process, of paraffin wax.

13. The process of claim 1 wherein the trichlorofluoromethane is added both prior to and after the addition of initiator.

14. The process of claim 13 wherein the ratio of trichlorofluoromethane to monomer is maintained constant throughout the polymerization process.

15. The process of claim 1 wherein the amount of surfactant is from about 0.1 to 0.2 weight percent.

16. The process of claim 1 wherein the amount of trichlorofluoromethane is from about 1.5 to 6.0 mole percent.

17. The process of claim 11 wherein the temperature is from about 70° to 80° C. and the pressure is from about 400 to 700 psig.

* * * * *